J. W. GIBSON.
CHECKROW PLANTER.
APPLICATION FILED JUNE 6, 1918.
1,331,102.
Patented Feb. 17, 1920.
3 SHEETS—SHEET 1.
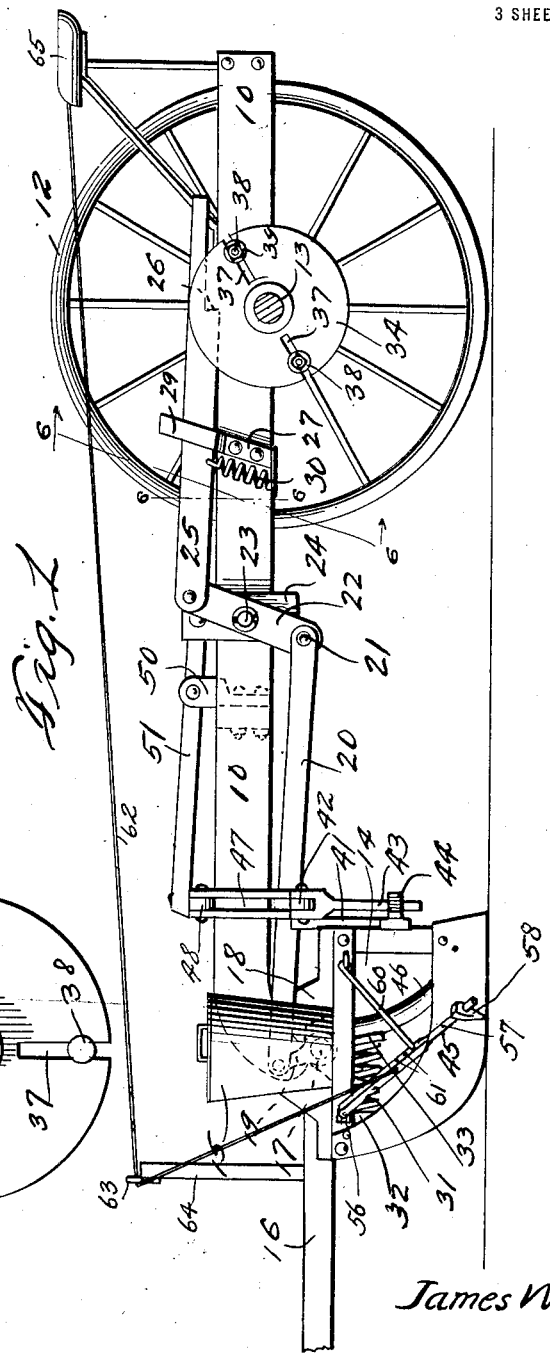
INVENTOR
James W Gibson
WITNESSES
BY
ATTORNEY

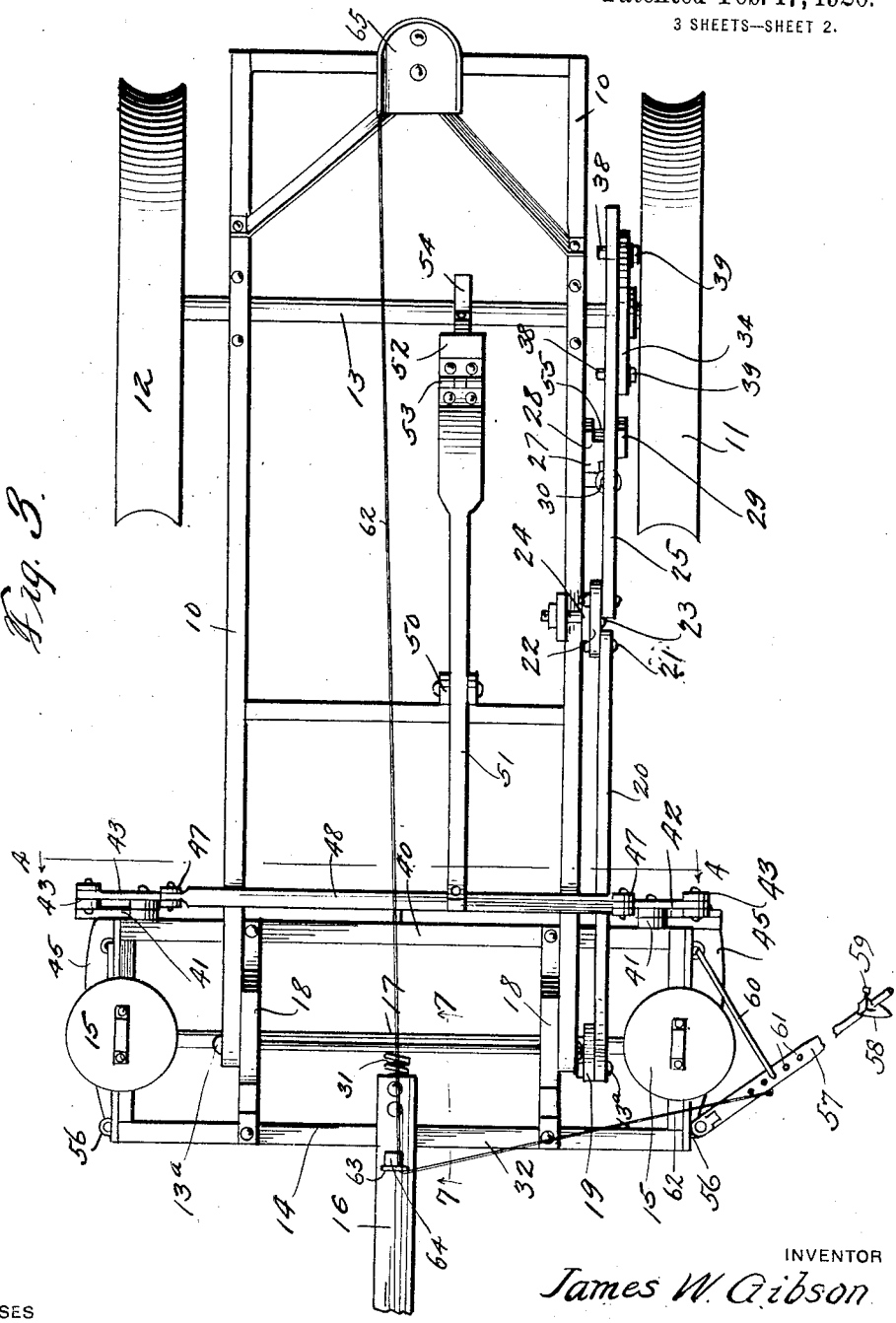

J. W. GIBSON.
CHECKROW PLANTER.
APPLICATION FILED JUNE 6, 1918.
1,331,102.
Patented Feb. 17, 1920.
3 SHEETS—SHEET 3.
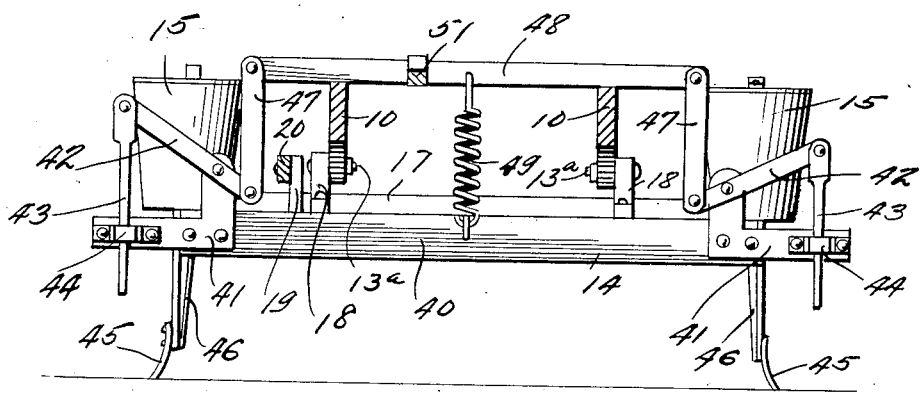
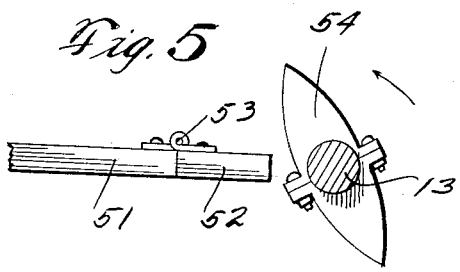
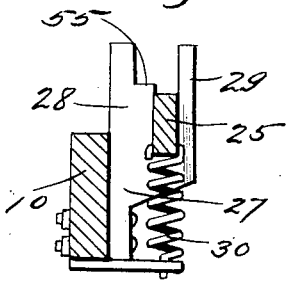
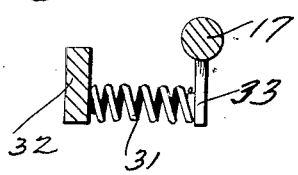
INVENTOR
James W. Gibson
WITNESSES
BY
ATTORNEY

UNITED STATES PATENT OFFICE.

JAMES WILBERT GIBSON, OF MOBERLY, MISSOURI.

CHECKROW-PLANTER.

1,331,102.  Specification of Letters Patent.  Patented Feb. 17, 1920.

Application filed June 6, 1918. Serial No. 238,532.

*To all whom it may concern:*

Be it known that I, JAMES WILBERT GIBSON, a citizen of the United States, residing at Moberly, in the county of Randolph and State of Missouri, have invented certain new and useful Improvements in Checkrow-Planters, of which the following is a specification.

This invention relates to planters and particularly to a check row attachment therefor which is operable through the rotation of the wheels of the planter and so dispenses with the use of the ordinary check wire common to planters of this class.

The object of the invention is to provide planters of this type with a simple, practical and reliable check row attachment which will mark upon the ground as the planter travels thereover the proper place for the grain to be deposited in the adjacent row on the return trip of the implement.

Another object of the invention is to provide means operated by the planter for actuating the planting devices synchronously with the marking devices, such means being given the quick jerking movement similar to that imparted by the check wire to ordinary planters for insuring positive deposition of the grain in the ground.

A further object of the invention is to provide means for adjusting the movements of the above mentioned devices to cause them to work in harmony and so produce the best results in the quickest time and with the least care and attention.

With these objects in view, together with others which will appear as the description proceeds, the invention resides in the novel formation, combination, and arrangement of parts, all as will be described more fully hereinafter, particularly pointed out in the claim, and illustrated in the accompanying drawings, in which:

Figure 1 is a side elevation of a corn planter with the improved check row device and grain planting mechanism mounted thereon.

Fig. 2 is a detail view of the disk for operating the planting mechanism as seen from the side opposite that shown in Fig. 1.

Fig. 3 is a top plan view of the improvements applied to a planter which may be of any well known type.

Fig. 4 is a cross sectional view of the planter on the line 4—4 of Fig. 3.

Fig. 5 is a detail view of the double-cam for actuating the hill marking device.

Fig. 6 is a cross sectional view through one side of the planter on the line 6—6 of Fig. 1, and, Fig. 7 is a sectional view on the line 7—7 of Fig. 3.

In the drawings, 10 indicates the frame of the planter which may be made of any material and in any form most convenient for the purpose, this frame being supported upon the ground wheels 11, 12 carried upon an axle 13 rotatable in bearings on the main frame and driven by one of the ground wheels as 12, the other ground wheel being preferably loose on the axle. The ground wheels and their supporting axles are preferably placed at the rear of the frame 10, the forward end of which frame is pivotally connected as at 13ª, to a secondary frame 14 upon which two grain hoppers 15 are carried and to which the pole or tongue 16 of the planter is connected.

Extending cross wise of the planter at the front thereof is a horizontal shaft 17 adapted to rock in bearings 18 mounted on the secondary frame 14, said shaft extending into the grain hoppers 15 to operate the planting devices at the bottom thereof. These planting devices, which may be of any well known type common to corn planters, are not claimed and being well known are not illustrated in the drawings. Fixed to the shaft 17 and extending upwardly therefrom at one side of the frame 10 is a lever arm 19 to which a link 20 is pivotally connected at one end, its other end having pivotal connections at 21 to a rock lever 22 pivotally mounted by a pin 23 on a bracket 24 carried by one of the side bars of the frame 10. The bracket 24 is adjustable forwardly and rearwardly on the frame to insure proper action and timing of the planting devices. To the opposite end of the lever 22 is pivotally connected a bar 25 that extends rearwardly above the axle 13 and is there formed with a shoulder 26 for a purpose shortly to be described. Bolted to the side of the frame 10 below the bar 25 is a bracket 27 having upwardly projecting fingers 28 and 29 between which fingers the bar 25 is adapted to slide, the fingers in fact forming a guide for the bar. A spring 30 is connected to the bar 25 and to the bottom of the frame 10 and serves to yieldingly hold said bar down between the fingers 28 and 29. Another spring 31 between the front beam 32 of the secondary frame 14 and a finger 33 depending from the underside of the rock shaft 17 serves to maintain the planting devices in such position as to close the outlets from the grain hoppers to the ground.

On the axle 13 near one end is adjustably mounted a disk 34 which may be held rigidly on the shaft by a set screw 35 extending through the hub 36 of the disk and bearing on said shaft. This enables the disk to be adjusted both longitudinally and rotatably upon the shaft 13. The disk 34 is formed with two radial slots 37 diametrically disposed, in each of which is mounted a pin 38 held in place by a nut 39 screwed upon the end of the pin which passes through the slot. These pins project inwardly from the disk 34 toward the frame 10 of the planter and are adapted to engage the shoulder 26 of the bar 25 and push said bar toward the front of the machine and rock the lever 22, which through the link connections described will rock the shaft 17 and actuate the planting means within the grain hoppers 15. The disk 34 is provided with two pins 38 in order to actuate the planting devices with each half revolution of the axle 13. This is made necessary because the circumference of the ground wheels 11 and 12 is equal to twice the distance between two rows of corn. Furthermore the adjustability of the pins radially in the disk 34 enables them to be set nearer to or farther from the axis of rotation and so decrease or increase the movement of the planting devices.

Bolted to the rear beam 40 of the secondary frame 14 and at each side of said frame outside the main frame 10 is a bracket 41 on each of which brackets is pivoted a rocking lever 42, the outer end of which is pivotally connected to a vertically movable staff 43 slidable through a guide 44 on the bracket 41. The lower end of each staff is held a short distance above the ground at one side of the shoe 45 and substantially in alinement with the outlet end of the grain conveying pipe 46 leading from the grain hopper 15. When the lever 42 is rocked, the lower end of the staff penetrates the earth at the side of the last planted hill of corn and so marks the location of such hill. Pivoted to the inner end of each rocking lever 42 is a link 47, which links extend vertically and are pivotally connected at their upper ends to the respective ends of a cross bar 48 which normally rests on the side bars of the frame 10. The bar 48 is held downwardly upon the frame 10 by a spring 49.

Bolted to the frame 10 at some suitable point between its ends is a bearing 50 in which is pivoted a lever 51, one end of the lever being connected to the cross bar 48. The opposite end of this lever extends nearly to the axle 13 and has a latch 52 hinged thereto at 53 in such manner that the latch can be freely swung upwardly and folded over upon the lever 51, but is held in alinement with said lever at the limit of its movement in the opposite direction in position to be engaged by a double cam 54 adjustably secured on the axle 13. The lever 51 will be operated twice for each rotation of the cam 54, raising the bar 48 at each operation to rock the levers 42 and press the staffs 43 into the ground. Reverse movement of the double cam 54 will of course strike the latch 52 on its under side and, swinging it upwardly on its hinge, permit the cam to pass freely without operating the lever 51. The cam 54 is preferably made in two parts as shown in Fig. 5 to permit its attachment to the axle and easy adjustment thereon.

When it is desired to stop the operation of the planting devices without stopping the forward travel of the planter, the bar 25 is lifted above the path of movement of the pins 38 and held in such elevated position by a shoulder 55 formed on the inner side of finger 28 of the guide bracket 27.

On each end of the secondary frame 14 near the front is secured a lug 56 to each of which is or may be pivoted an arm 57 in such manner that said arm may swing both horizontally and vertically on said lug. Slidable longitudinally on the outer end of the arm 57 is a pointer 58 which is adapted to be secured to the arm 57 after adjustment by means of a bolt 59. For the purpose of holding the corn hill guide, consisting of the arm 57 and pointer 58, in proper relation with the planting devices, there is pivotally mounted at the side of the secondary frame 14 near the rear thereof, a hook 60 adapted to engage any one of a series of perforations 61 in the arm 57. By means of this hook and the bolt 59, the position of the pointer 58 with relation to the hills of planted corn, may be readily adjusted.

In using the planter, if the same is to be drawn to the field to be planted, the bar 25 is raised and supported on the shoulder 55 and the latch 52 folded upon the lever 51. This enables the planter to be moved wherever desired without operating the planting or hill marking mechanisms. After the field has been reached and the machine drawn to the starting place for planting the first row of corn, the bar 25 is lowered into position to be operated by the pin disk 34. The planter is now ready for work and upon drawing the same through the field, two rows of corn will be planted, the hills of each row being properly spaced through the operation of the pins 38 engaging the shoulder 26 in the bar 25. When near the end of the field and a few more hills only are to be planted the latch 52 is swung rearwardly into operative position in order to be engaged by the double cam 54, which upon striking the latch, will operate the lever 51 and cause the staffs 43 to enter the ground and make an easily distinguished mark therein to serve as a guide for planting the next two rows of corn after the planter has been turned around. The disk 34 and double cam 54 are made adjustable on the axle 13 that they may be set to engage the bar 25 and latch 52 simultaneously or in such relation as will cause the hill marker or staffs 43 to penetrate the ground at the sides of the hill then being planted with corn.

After the planter has been turned around to make a return trip through the field, the arm 57, which heretofore has been in elevated position, is lowered so that the pointer 58 will rest upon the ground and the planter manipulated in such manner that this pointer will engage the mark made by the staff 43 adjacent the last hill of corn planted. The fixed ground wheel is then lifted from the ground so that it may be rotated and the axle 13 turned until one of the pins 38 has been brought into position to move the bar 25 and so operate the planting devices. Attention is here called to the fact that for properly spacing the rows and the hills of corn, the position of the arm 57 must be so adjusted that the pointer 58 thereon when placed in the last hill mark, will bring the adjacent shoe 45 the proper distance for planting the next row of corn. Furthermore, the pointer 58 must be so adjusted longitudinally of the arm 57 that its point when placed in the hill marker as previously stated, will be in advance of the lower or delivery end of the grain conveying pipe 46, a distance equal to the distance which the planter must travel before the rotation of the pin 38 will operate the planting devices. For instance, if the distance which the planter must move before the planting devices are operated when the pin 38 is in the position stated, is six inches, it follows that the pointer 58 must be adjusted on the arm 57 at such a point that its lower end will engage the ground six inches in advance of the lower end of the grain delivering tube 46. The planter being thus set, it is now drawn back across the field and after planting a few hills, the latch 52 is again swung forwardly to disengage the hill marker and the arm 57 raised from the ground. This arm may be raised by a rope 62 secured to the arm and passing through a loop 63 on a vertical post 64 fixed to the tongue 16, the rope extending rearwardly to the driver's seat 65. In place of the rope, a lever or any other means may be employed for raising the arm 57.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent, is:

In a device of the class described, the combination with a frame, a rotatable shaft journaled therein, a disk adjustably mounted on said shaft, said disk provided with diametrically disposed radial slots, pins adjustably mounted within said slots and projecting from one side of the disk, of a rock lever pivoted between its ends on the frame, a push bar pivoted to the upper end of the rock lever and leading thence rearward alongside of the disk and having a shoulder with which said pins successively engage, a guide bracket having fingers between which said push bar slides and one of said fingers having an elevated shoulder for holding the shoulder of this bar out of engagement with said pins, a spring drawing the rear end of said bar normally downward, and an operated mechanism connected with the other arm of said lever.

In testimony whereof I affix my signature in presence of two witnesses.

JAMES WILBERT GIBSON.

Witnesses:
 LOGAN COATES,
 VIRGIL W. WILHITE.